(12) United States Patent
Westman et al.

(10) Patent No.: US 7,943,380 B2
(45) Date of Patent: May 17, 2011

(54) LEAK DETECTION MATERIALS AND METHODS

(75) Inventors: Morton A. Westman, Oak Brook, IL (US); John A. Andrews, Oak Park, IL (US); Charles Allen Steele, Oak Park, IL (US); Terrence D. Kalley, Troy, MI (US)

(73) Assignee: Bright Solutions, Inc., Troy, MI (US)

( * ) Notice: Subject to any disclaimer, the term of this patent is extended or adjusted under 35 U.S.C. 154(b) by 1510 days.

(21) Appl. No.: 10/858,522

(22) Filed: Jun. 2, 2004

(65) Prior Publication Data

US 2005/0272844 A1    Dec. 8, 2005

(51) Int. Cl.
*C08K 5/06* (2006.01)
*G01M 3/00* (2006.01)

(52) U.S. Cl. .................... 436/4; 436/2; 436/3

(58) Field of Classification Search ............ 73/40.7, 73/104, 40; 436/61, 4, 3, 2; 250/302
See application file for complete search history.

(56) References Cited

U.S. PATENT DOCUMENTS

| | | |
|---|---|---|
| 1,279,679 A | 9/1918 | Fear |
| 1,800,693 A | 4/1931 | Major |
| 1,915,965 A | 6/1933 | Williams |
| 1,935,901 A | 11/1933 | Augenblick |
| 2,096,099 A | 10/1937 | Gaugler |
| 2,260,608 A | 10/1941 | Cormack |
| 2,341,430 A | 2/1944 | Elsey |
| 2,526,938 A | 9/1946 | Davis et al. |
| 2,428,426 A | 10/1947 | Lindsay |
| 2,506,806 A | 5/1950 | Metzger |
| 2,579,053 A | 12/1951 | Schulstadt |
| 2,682,857 A | 7/1954 | Reissmann |
| 2,757,632 A | 8/1956 | Wittlin |
| 2,918,033 A | 12/1959 | Snyder |
| 2,918,893 A | 12/1959 | Norton |
| 2,994,295 A | 8/1961 | Newcum |
| 3,006,861 A | 10/1961 | Browning et al. |
| 3,027,754 A | 4/1962 | Alquist et al. |
| 3,118,463 A | 1/1964 | Lacart |
| 3,121,615 A | 2/1964 | Price |
| 3,225,554 A | 12/1965 | Alexander |
| 3,234,045 A | 2/1966 | Larsen |
| 3,323,350 A | 6/1967 | Roberts |
| 3,361,547 A | 1/1968 | Packo |
| 3,370,013 A | 2/1968 | Labac |
| 3,476,500 A | 11/1969 | Litke |
| 3,572,085 A | 3/1971 | Packo |
| 3,715,227 A * | 2/1973 | Alburger ............ 427/8 |
| 3,770,640 A | 11/1973 | Bartlett |
| 3,774,022 A | 11/1973 | Dubrow et al. |
| 3,785,164 A | 1/1974 | Wrenn, Jr. |
| 3,838,578 A | 10/1974 | Sakasegawa et al. |
| 3,856,465 A * | 12/1974 | Lipscomb ............ 73/104 |
| 3,876,378 A | 4/1975 | Montagnon |
| 3,898,172 A | 8/1975 | Reif et al. |
| 3,960,001 A | 6/1976 | Hayes |
| 4,046,507 A | 9/1977 | Zweifel et al. |
| 4,072,615 A | 2/1978 | McConnell |
| 4,109,487 A | 8/1978 | Carr |
| 4,120,780 A | 10/1978 | Morimoto et al. |
| 4,170,564 A | 10/1979 | Brendle |
| 4,176,205 A | 11/1979 | Molina |
| 4,187,798 A | 2/1980 | Yoshimura |
| 4,249,412 A | 2/1981 | Townsend, III |
| 4,272,264 A | 6/1981 | Cullen et al. |
| 4,288,402 A | 9/1981 | Ellis |
| 4,348,235 A | 9/1982 | Lasswell et al. |
| 4,369,120 A | 1/1983 | Stelz et al. |
| 4,382,679 A | 5/1983 | Lee |
| 4,436,641 A | 3/1984 | Stelz et al. |
| 4,487,707 A | 12/1984 | Holzknecht |
| 4,513,578 A | 4/1985 | Proctor et al. |
| 4,612,798 A | 9/1986 | Roberts |
| 4,662,940 A | 5/1987 | Monier |
| 4,688,388 A | 8/1987 | Lower et al. |
| 4,690,689 A | 9/1987 | Malcosky et al. |
| 4,693,118 A | 9/1987 | Roberts |
| 4,745,772 A | 5/1988 | Ferris |
| 4,758,366 A | 7/1988 | Parekh |
| 4,784,959 A | 11/1988 | Wegrzyn |
| 4,822,743 A | 4/1989 | Wegrzyn |
| 4,862,698 A | 9/1989 | Morgan et al. |

(Continued)

FOREIGN PATENT DOCUMENTS

GB    1199675    7/1970

OTHER PUBLICATIONS

Davis, "Don't Lose Your Cool Over Refrigerant Leaks", Air Conditioning, Heating & Refrigeration News, p. 10-11, May 2, 1994.
Davis, "Pinpointing HFC-134a Leaks is Easy if You Use the Proper Equipment", Air Conditioning, Heating & Refrigeration News, p. 36-37, Dec. 7, 1992.
Davis, Pinpointing Vehicle Leaks Faster with Ultraviolet Light:, Materials Evaluation, vol. 47, pp. 1248-1250, Nov. 1989.
Marrano, "Fluorescent Tracer Additives as a Nondestructive Inspection Technique for Leak Testing", Materials Evaluation, vol. 51, No. 4, pp. 436-438, Apr. 1993.
The Spectroline, vol. 1, No. 1, HVAC Edition, Spring 1991.
Feimeister, Powders Particle Size Reduction, Classification, and Measurement—Mixing of Powders—Powders as a Dosage Form, Remington's Pharmaceutical Sciences, 14th ed., Chapter 86, pp. 1626-1648.
Webster's II New Riverside University Dictionary, Soukhanov, A.H. (Ed.), The Riverside Publishing Company, 1988, p. 759.

(Continued)

*Primary Examiner* — Walter D Griffin
*Assistant Examiner* — Christine T Mui
(74) *Attorney, Agent, or Firm* — Steptoe & Johnson LLP

(57) ABSTRACT

A leak detection material and method of introducing the leak detection material into a fluid system such as a climate control system, an engine oil system, or a fuel system is described. The leak detection material can be a dye delivery composition including a mixture of leak detection dye and a solid carrier.

11 Claims, No Drawings

U.S. PATENT DOCUMENTS

| | | |
|---|---|---|
| 4,897,551 A | 1/1990 | Gersh et al. |
| 4,909,806 A | 3/1990 | Garbe |
| 4,938,031 A | 7/1990 | Manz et al. |
| 4,938,063 A | 7/1990 | Leighley |
| 5,022,902 A | 6/1991 | Juhl et al. |
| 5,071,993 A | 12/1991 | Leppard et al. |
| 5,132,260 A | 7/1992 | Plee |
| 5,152,926 A | 10/1992 | Brown |
| 5,167,140 A | 12/1992 | Cooper et al. |
| 5,167,867 A | 12/1992 | Quaife et al. |
| 5,251,453 A | 10/1993 | Stanke et al. |
| 5,272,882 A | 12/1993 | Degier et al. |
| 5,301,537 A | 4/1994 | Atkinson |
| 5,357,782 A | 10/1994 | Henry |
| 5,396,774 A | 3/1995 | Hubbell, Jr. |
| 5,421,192 A | 6/1995 | Henry |
| 5,440,919 A | 8/1995 | Cooper |
| 5,558,808 A | 9/1996 | Smith et al. |
| 5,560,855 A | 10/1996 | Hinton et al. |
| 5,650,563 A | 7/1997 | Cooper et al. |
| 5,681,984 A * | 10/1997 | Cavestri .................. 73/40.7 |
| 5,979,226 A * | 11/1999 | Cavestri et al. .......... 73/40.7 |
| 6,070,455 A * | 6/2000 | Cavestri .................. 73/40.7 |
| 6,178,809 B1 * | 1/2001 | Cavestri .................. 73/40.7 |
| 6,183,663 B1 * | 2/2001 | Kalley et al. ............ 252/68 |
| 6,469,300 B1 * | 10/2002 | Trigiani et al. .......... 250/302 |
| 6,595,039 B2 * | 7/2003 | Brass ..................... 73/40.7 |
| 2003/0044523 A1 * | 3/2003 | Brass ..................... 427/157 |

* cited by examiner

LEAK DETECTION MATERIALS AND METHODS

BACKGROUND

The invention relates to a materials and methods of leak detection in a fluid system.

Leak detection methods have been developed to analyze fluid systems, such as climate control systems (e.g., heating, cooling, ventilating, and air conditioning systems), hydraulics, engine oil systems, automatic transmission systems, fuel systems, brake systems, or radiator coolant systems, using dyes. Some methods employ emissive substances, such as, for example, fluorescent or phosphorescent dyes that are added to the refrigerants and/or lubricants of a climate control system.

Leaks can be detected by observing fluorescence of the dye at leak sites resulting from excitation of the dye with a light source having particular illumination characteristics, such as illumination wavelength or intensity. Suitable light sources for use in fluorescence detection emit light of wavelengths suitable to excite the dye and cause light emission from the dye, which is at a greater wavelength than the excitation wavelength. In general, the dyes fluoresce brightly when excited by light in the 190 to 700 nanometer wavelength range. A variety of systems have been developed to introduce a leak detection dye into air conditioning systems, including injectors that place fluid compositions containing the dye into an operational air conditioning system.

SUMMARY

In general, the leak detection material and method employ a dye delivery composition. The dye delivery composition is a solid that melts at a delivery temperature to form a delivery fluid. The dye delivery composition can be a mixture of a leak detection dye and a solid carrier. The mixture can be a suspension of dye particles in a solid carrier or a solution of the dye in a solid carrier. In examples, the dye can be partially or completely dissolved in the solid carrier. The solid carrier is a composition or compound that is compatible with the lubricant or refrigerant of the fluid system.

In one aspect, a dye delivery composition includes a solution of a carrier and a leak detection dye. The carrier is soluble in a lubricant of a fluid system. The composition has a loading of dye that remains soluble in the carrier between −40° C. and 100° C. The composition is a solid at a temperature below 30° C. and a liquid above 80° C.

In another aspect, a dye delivery composition includes a carrier and a leak detection dye. The carrier includes a wax and a polyether. The composition is a solid at a temperature below 30° C.

In another aspect, a method of manufacturing a dye delivery composition includes combining a carrier and a leak detection dye to form a mixture. The composition being a solid at a temperature below 30° C. and a liquid above 80° C.

In another aspect, a method of introducing a leak detection dye in a fluid system includes contacting a dye delivery composition including a carrier and a leak detection dye with a surface of a component of the fluid system and forming a solid coating of the dye delivery composition on the surface of the component. The method can include assembling the climate control system including the component. The method can include heating the dye delivery composition to form a fluid prior to contacting with the surface of the component. The method can include heating the dye delivery composition to form a fluid after contacting with the surface of the component.

In another aspect, a component of a fluid system includes a surface in contact with a solid dye delivery composition including a carrier and a leak detection dye, the carrier including a wax and a polyether, the composition being a solid at a temperature below 30° C.

The dye delivery composition can include at least 0.5 weight percent of a leak detection dye, at least 2 weight percent, at least 10 weight percent of the leak detection dye, at least 25 weight percent of the leak detection dye, at least 40 weight percent of the leak detection dye, at least 50 weight percent of the leak detection dye, at least 60 weight percent or at least 70 weight percent of the leak detection dye.

The composition can be a solid at a temperature below 35° C. or below 40° C. The composition can be a liquid at a temperature above 70° C., above 60° C. or above 50° C.

The carrier can include a wax. The carrier can include a fatty acid polyalkylene glycol ester or a fatty acid polyalkylene glycol amide, such as a tallow amide. The carrier can include a polyether, such as a glycol ether.

Additional features and advantages of the invention will become apparent from the detailed description of the preferred embodiments of the invention.

DETAILED DESCRIPTION

A dye delivery composition includes a leak detection dye and a carrier. The composition has a dye content selected so that the dye can remain soluble in the carrier between −40° C. and 100° C. In particular examples, the dye remains soluble in the carrier for more than one month at a temperature below 0° C. The composition is a solid at a temperature below 30° C. In particular examples, the composition is solid at a temperature below 35° C. or below 40° C. The composition can melt at relatively low temperatures. When melted, the composition can readily flow or be sprayed. The composition can be a liquid at a temperature above 80° C. In particular examples, the composition can be a liquid at a temperature above 70° C., above 60° C., above 50° C. The composition can have a melting point of 40° C. to 60° C.

The leak detection dye can include a naphthalimide, a perylene, a coumarin, a thioxanthane, or a derivative thereof, or other dye compatible with a system, e.g., a climate control, an engine oil, or fuel system. The composition can contain greater than 0.5 wt % of leak detection dye.

The carrier is selected to solubilize the dye. The carrier is also selected to be compatible with a fluid of the fluid system. For example, the carrier is soluble in the fluid of the fluid system. The fluid of the fluid system can include an engine oil, a lubricating oil compatible with an engine or fuel system, a synthetic oil, a polyalkylene glycol, a polyolester, a mineral oil, a polyvinyl ether, an alkylbenzene, or another synthetic lubricating material. The engine oil can be 10W40, 15W50, 5W30, or any other engine oil. Suitable polyalkylene glycol or polyol ester lubricants include, for example, Emery 2927a, Mobil Arctic EAL 68, Union Carbide UCON 488 Refrigeration Lubricant, Union Carbide UCON MLX-1197 Experimental Lubricant, Union Carbide 50-HB5100, Motorcraft YN-12B, Ford PAG, Chrysler PAG, or any other automotive PAG. UCON 488 is a polyalkylene glycol having a viscosity of about 133 centistokes at 40EC. Union Carbide 50-HB5100 is a polyalkylene glycol having a viscosity of about 1020 centistokes at 40EC. Motorcraft YN-12B is a polyalkylene glycol having a viscosity of about 56 centistokes at 40EC.

The carrier can include a wax. The wax can be a fatty acid, a fatty alcohol, a fatty acid ester a fatty acid amide, a resin composition, a polyol ester, a polyol amide, a polyalkylene glycol, or a hydrocarbon, or mixtures thereof. The wax can be a polyalkylene glycol fatty acid ester or a polyalkylene glycol fatty acid amide. The polyalkylene glycol can be a polyethylene glycol or polypropylene glycol oligomer. The oligomer can be a 5-mer or longer. The oligomer can be a 1000-mer or shorter. The oligomer can be a 10-mer to 100-mer.

The carrier can include an alkanolamide (such as N-alkyl pyrrolidone), an ethoxylated amide (for example, the polyethylene glycol amide of tallow acid that conforms generally to the formula $RC(O)-NH-(CH_2CH_2O)_nH$ where $RC(O)-$ represents a fatty acid, e.g., derived from tallow, and n has an average value of 50 (also called PEG-50 tallow amide)), an amine oxide (for example, cocamidopropylamine oxide), an ethoxylated carboxylic acid (for example, the polyethylene glycol diester of lauric acid that conforms generally to the formula $CH_3(CH_2)_{10}C(O)-(OCH_2CH_2)_nO-C(O)(CH_2)_{10}CH_3$ where n has an average value of 8 (also called PEG-8 dilaurate)), an ethoxylated glyceride (for example, a polyethylene glycol derivative of Castor Oil with an average of 4 moles of ethylene oxide (also called PEG-4 castor oil)) a glycol ester (for example, propylene glycol ricinoleate), a monoglyceride (for example, glycerol myristate), a polyglyceryl ester (for example, polyglyceryl-4 oleyl ether), a polyhydric alcohol ester or ether (for example, sucrose distearate), a sorbitan or sorbitan ester (for example, sorbitan sesquiisostearate), a triester of phosphoric acid (for example, trioleth-8 phosphate (a material which is predominantly the triester of phosphoric acid and ethoxylated oleyl alcohol with an average of 8 moles of ethylene oxide)), an ethoxylated alcohol (for example, laureth-4), an ethoxylated lanolin (for example, a polyethylene glycol derivative of Lanolin with an average of 20 moles of ethylene oxide (also called PEG-20 lanolin)), an ethoxylated polysiloxane (for example, dimethicone copolyol), a propoxylated polyoxyethylene ether (for example, the polyoxypropylene, polyoxyethylene ether of cetyl alcohol that conforms generally to the formula $CH_3(CH_2)_{14}CH_2(OCH(CH_3)CH_2)_x(OCH_2CH_2)_yOH$ where x has an average value of 5 and y has an average value of 20 (also called PPG-5 ceteth-20)), or a alkylpolyglycoside (for example, lauryl glucose).

The carrier can also include a low vapor pressure organic compound. The low vapor pressure organic compound can help stabilize the composition when coated on a surface as a thin layer. The low vapor pressure organic compound can be a polyalkylene ether, such as an alkyloxyalkanol compound. The alkyloxyalkanol can be, for example, a substituted or unsubstituted $C_2$-$C_{16}$ alkyloxy-$C_2$-$C_{16}$ alkanol. For example, the low vapor pressure organic compound can be an alkyloxyethoxy ethanol, such as 2-(2-butoxyethoxy)ethanol. The carrier can include polyol esters such as triglycerides or diglycerides having saturated or unsaturated $C_4$-$C_{18}$ chains. The esters can be $C_1$-$C_{18}$ alkyl esters. In particular, the binding agent can include stearic acid, methyl stearate, coconut oil, tricaprin, hydrenol, Lorol(C16), Lorol(C18), cocoa butter, methyl laurate, methyl myristate, coconut fatty acid, methyl coconate, lauryl alcohol, cetyl alcohol, peanut oil, hydrogenated coconut oil, and hydrogenated peanut oil. Tricaprin is a $C_{12}$ compound. Preferred binding agents include stearic acid, methyl stearate, coconut oil, and coconut fatty acid. A variety of carriers are available, for example, from Aldrich Chemical Co., Abitec Corporation, Henkel, Universal Preserve-A-Chem, or Scher Chemicals, Inc, of Clifton, N.J.

The dye delivery composition can be placed in a system, i.e., climate control, fuel, or oil system, or a component of a system. The dye delivery composition can be placed in a component of the system, for example, during manufacture or during service. Placing the dye delivery composition in a component can include, for example, depositing the dye delivery composition onto a portion of an inside or outside surface of the component or inserting the dye delivery composition into the interior of the component. The dye delivery composition can be melted prior to placement into the component as a film or layer on a surface of the component that then cools to form a solid. Alternatively, a solid form of the dye delivery composition can be contacted with a surface of the component and subsequently heated to wet the surface of the component, and cooled to form a solid. The method can include assembling the system after placing the composition into or onto the component. In other embodiments, the dye delivery composition can be injected into a component of an assembled system. The composition can be dispensed as a liquid into the system by, for example, a syringe or other metering device.

The fluid system can be a climate control system, an engine oil system, an automatic transmission system, a fuel system, a brake system, or a radiator coolant system. The method can include placing a dye delivery composition in a component of the climate control system. The climate control system can be a mobile, stationary, window air conditioning system such as an automotive, portable, residential, or commercial air conditioning system, or any other hermetic system that employs a refrigerant and lubricant.

The system can include a refrigerant. The refrigerant can include chlorofluorocarbons, hydrochlorofluorocarbons, hydrofluorocarbons, carbon dioxide, ammonia, halogenated or ether derivatives of methane or ethane, or halogenated ether or cyclic derivatives of propane, butane, pentane, or other hydrocarbons. The system can also include a lubricant. The refrigerant, lubricant, or refrigerant-lubricant mixture can dissolve the leak detection dye and distribute it throughout the system. The leak detection dye is soluble in the refrigerant, or combinations of the refrigerant and lubricant.

The location for placement of the composition in the system can be selected to increase the dissolution rate of the composition. For example, components that have a greater flow of refrigerant or a greater flow of lubricant can be selected to provide more rapid dissolution rates. Similarly, components that contain the refrigerant or the lubricant at higher temperatures can be selected to provide more rapid dissolution rates.

In an air conditioning system, the component can be a liquid line receiver, a receiver drier, a filter drier, an accumulator, a compressor, a condenser, a high pressure discharge line, a discharge muffler, a liquid line heat exchanger, a filter pad, filter media, an expansion device (e.g., an expansion valve or orifice tube), a suction line, a suction muffler, an orifice tube, a hose line, an expansion valve, a fitting assembly, a filter assembly, or an evaporator. In an engine oil or fuel system the dye delivery composition can be placed in a component of the system. The component can be an oil filter, an engine block, an oil pan, a fuel tank, or a fuel filter.

A dye delivery composition can have a sufficiently high melting point to allow it to be placed directly onto the system or a component of the system without dripping or otherwise running off of the component at ordinary environmental temperatures. Introducing a leak detection dye as a dye delivery composition during the assembly of the system, i.e., climate control, fuel, or oil system, can enable the system to be tested for leaks to provide a quality assurance tool prior to shipment of the system. It can also facilitate checking the system for leaks at a later time in the field without charging the system with additional leak detection dye. The dye delivery composition can provide a simple way to insert dyes into, for example, an air conditioning system rapidly and cleanly, without needing to charge the system with refrigerant at the time of dye insertion. The dye delivery composition can provide a simple way to insert dyes into, for example, an engine oil or fuel system rapidly and cleanly. The dye delivery composition can dissolve rapidly in a fluid of the fluid system.

Insertion location, composition properties, and dye properties can be selected to improve cost, ease of insertion, cleanliness of handling, capital equipment costs, material waste, environmental impact, shelf life prior to insertion in the system, and chemical life once introduced into the system. The composition can be substantially compatible with known systems because the composition can include only the carrier and the leak detection dye.

The dye delivery composition can be easy to handle and use. Because the dye delivery composition is a solid on a surface of a component of the fluid system, use of the composition can reduce the risk of contaminating the work environment with the dye, which can lead to erroneous leak detection. In addition, the composition dissolves completely either in a mixture of lubricant and refrigerant or in oil or fuel. The dye delivery composition can be essentially solvent-free and can be substantially free of impurities that could otherwise damage a system. Small amounts of other additives such as preservatives (e.g., antioxidants or biocides) can be included in the composition.

After placing the composition into a system, e.g, an air conditioning, fuel, or oil system, the system is operated to circulate the refrigerant and lubricant. The circulating refrigerant, lubricant, or refrigerant-lubricant mixture dissolves the leak detection dye, dispersing it throughout the system. Once dissolved, the dye content of the system can be below about 1.0, less than 0.5 percent, and less than about 0.1 percent. After the dye has been allowed to circulate within the system, system components, joints, fittings, or attachments can be examined for leaks with a light source having a light emission wavelength from 190 nanometers to 700 nanometers. The presence of a leak can be determined by the presence of a colored visual indication, such as fluorescence or other emission, that can be detected after excitation with the light from the light source.

Several techniques are available for preparing the dye delivery composition. Generally, particles of the leak detection dye are combined with the carrier to form a mixture. The mixture can be heated to form a liquid solution, and cooled to form the composition.

The following examples are illustrative of the materials and methods described above.

EXAMPLES

A dye delivery composition was prepared having the following composition:

| | |
|---|---|
| 5 wt % | Naphthalimide (CAS # 19125-99-6) |
| 10 wt % | 2-(2-Butoxyethoxy)ethanol (CAS # 112-34-5) |
| 85 wt % | PEG-50-tallow amide (CAS # 68783-22-2) |

The materials were warmed and mixed to form a solution of naphthalimide dye in the carrier of PEG-50-tallow amide and glycol ether. Upon cooling the mixture, a solid solution of naphthalimide in the carrier was obtained. The dye delivery composition becomes completely fluid above 60° C. When the dye delivery composition was cooled to −20° C. for 14 days, the dye remained dissolved in the carrier.

Other embodiments are within the claims. For example, the composition can be used to introduce leak detection dyes into an automatic transmission system, a hydraulic system, a machine lubricating system, a brake system, or a radiator coolant system.

What is claimed is:

1. A method of introducing a leak detection dye in a fluid system, the method comprising:
   melting a solid dye delivery composition including a carrier and a leak detection dye to form a liquid dye delivery composition, wherein the carrier includes a wax;
   contacting the dye delivery composition with a surface of a component of the fluid system; and
   forming a solid coating of the liquid dye delivery composition on the surface of the component wherein the composition is a solid at a temperature below 35° C. and a liquid above 80° C.

2. The method of claim 1, wherein the fluid system is a climate control system.

3. The method of claim 2, wherein the climate control system is an air conditioning system.

4. The method of claim 2, wherein the component is a liquid line receiver, a receiver drier, a filter drier, an accumulator, a compressor, a condenser, a high pressure discharge line, a discharge muffler, a liquid line heat exchanger, a filter pad, filter media, an expansion device, a suction line, a suction muffler, an orifice tube, a hose line, a expansion valve, a fitting assembly, a filter assembly, an access fitting, a charging port, a reservoir, or an evaporator.

5. The method of claim 2, further comprising assembling the climate control system including the component.

6. The method of claim 1, wherein the fluid system is an engine oil system or a fuel system.

7. The method of claim 6, wherein the component is an oil filter, an engine block, an oil pan, a fuel tank, or a fuel filter.

8. The method of claim 1, further comprising heating the dye delivery composition to form a fluid prior to contacting with the surface of the component.

9. The method of claim 1, further comprising heating the dye delivery composition to form a fluid after contacting with the surface of the component.

10. The method of claim 1, wherein the composition is a liquid at a temperature above 60° C.

11. The method of claim 1, wherein the melting a dye delivery composition and the contacting the dye delivery composition with a surface of a component of the fluid system include contacting a solid form of the dye delivery composition with the surface of the component and subsequently heating the dye delivery composition to wet the surface of the component, and then cooling to form the solid coating.

* * * * *